US008980214B2

(12) United States Patent
Kato et al.

(10) Patent No.: US 8,980,214 B2
(45) Date of Patent: *Mar. 17, 2015

(54) METHOD FOR PRODUCING DIFLUOROPHOSPHATE, NON-AQUEOUS ELECTROLYTE FOR SECONDARY CELL AND NON-AQUEOUS ELECTROLYTE SECONDARY CELL

(75) Inventors: Ryoichi Kato, Inashiki-gun (JP);
Hirofumi Suzuki, Inashiki-gun (JP);
Jun Sasahara, Inashiki-gun (JP);
Hitoshi Suzuki, Inashiki-gun (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1016 days.

This patent is subject to a terminal disclaimer.

(21) Appl. No.: 11/993,376

(22) PCT Filed: Oct. 31, 2005

(86) PCT No.: PCT/JP2005/020001
§ 371 (c)(1),
(2), (4) Date: Aug. 6, 2008

(87) PCT Pub. No.: WO2006/137177
PCT Pub. Date: Dec. 28, 2006

(65) Prior Publication Data
US 2008/0305402 A1      Dec. 11, 2008

(30) Foreign Application Priority Data
Jun. 20, 2005 (JP) ................................. 2005-178828

(51) Int. Cl.
| | |
|---|---|
| C01B 25/10 | (2006.01) |
| H01M 6/16 | (2006.01) |
| C01B 25/455 | (2006.01) |
| H01M 10/0525 | (2010.01) |
| H01M 10/0567 | (2010.01) |
| H01M 10/0568 | (2010.01) |
| H01M 10/0569 | (2010.01) |

(52) U.S. Cl.
CPC .............. *C01B 25/10* (2013.01); *C01B 25/455* (2013.01); *H01M 10/0525* (2013.01); *H01M 10/0567* (2013.01); *H01M 10/0568* (2013.01); *H01M 10/0569* (2013.01); *H01M 2300/0025* (2013.01); *Y02E 60/122* (2013.01)
USPC ........... 423/301; 423/305; 429/189; 429/324; 429/338

(58) Field of Classification Search
USPC ................................................. 429/326, 199
See application file for complete search history.

(56) References Cited

U.S. PATENT DOCUMENTS

| | | | | |
|---|---|---|---|---|
| 4,440,836 | A * | 4/1984 | Bailey ............................. | 429/48 |
| 5,595,842 | A | 1/1997 | Nakane et al. | |
| 6,489,055 | B1 * | 12/2002 | Ichihashi et al. .............. | 429/188 |
| 6,746,804 | B2 * | 6/2004 | Gan et al. ...................... | 429/326 |
| 2004/0081891 | A1 * | 4/2004 | Yamaguchi et al. .......... | 429/303 |
| 2008/0102376 | A1 * | 5/2008 | Kato et al. .................... | 429/332 |

FOREIGN PATENT DOCUMENTS

| | | |
|---|---|---|
| DE | 197 49 374 A1 | 5/1998 |
| JP | 58 181710 | 10/1983 |
| JP | A-1-286263 | 11/1989 |
| JP | 05-283104 A | 10/1993 |
| JP | 06-119939 A | 4/1994 |
| JP | 6-150975 | 5/1994 |
| JP | 7-220758 | 8/1995 |
| JP | 7-249431 | 9/1995 |
| JP | 08-050923 A | 2/1996 |
| JP | 8-64246 | 3/1996 |
| JP | 10 144345 | 5/1998 |
| JP | 11-67270 | 3/1999 |
| JP | 11 67270 | 3/1999 |
| JP | A-11 67270 | 3/1999 |
| JP | 2000 188128 | 7/2000 |
| JP | 2001-68162 | 3/2001 |
| JP | 3439085 | 6/2003 |
| JP | 2004 31079 | 1/2004 |
| JP | A-2004 31079 | 1/2004 |
| JP | 2005-71749 | 3/2005 |
| KR | 10-2007-0065395 | 6/2007 |
| WO | WO 00/38265 | 6/2000 |

OTHER PUBLICATIONS

Machine Translation of JP 2004031079.*
D. Aurbach, B. Markovsky, A. Shechter, and Y. Ein-El,. A Comparative Study of Synthetic Graphite and Li Electrodes in Electrolyte Solutions Based on Ethylene Carbonate-Dimethyl Carbonate Mixtures, Dec. 1996, J. Electrochem. Soc. vol. 143, No. 12, pp. 3809-3820.*
Li et al., Journal of The Electrochemical Society, vol. 152, No. 7, 2005, A1361-A1365.*
Campion et al., Electrochemical and Solid-State Letters, vol. 7, No. 7, 2004, A194-A197.*
Translation of JP 01-286263 A.*

(Continued)

*Primary Examiner* — Barbara Gilliam
*Assistant Examiner* — Robert S Carrico
(74) *Attorney, Agent, or Firm* — Oblon, McClelland, Maier & Neustadt, L.L.P.

(57) ABSTRACT

A difluorophosphate effective as an additive for a nonaqueous electrolyte for secondary battery is produced by a simple method from inexpensive common materials.
The difluorophosphate is produced by reacting lithium hexafluorophosphate with a carbonate in a nonaqueous solvent. The liquid reaction mixture resulting from this reaction is supplied for providing the difluorophosphate in a nonaqueous electrolyte comprising a nonaqueous solvent which contains at least a hexafluorophosphate as an electrolyte lithium salt and further contains a difluorophosphate. Also provided is a nonaqueous-electrolyte secondary battery employing this nonaqueous electrolyte.

4 Claims, No Drawings

(56) References Cited

OTHER PUBLICATIONS

U.S. Appl. No. 13/053,874, filed Mar. 22, 2011, Kato, et al.
Office Action issued Sep. 28, 2010 in JP Application No. 2004-121852 (With English Translation).
Office Action issued on Jan. 27, 2011 in the corresponding Chinese Application No. 201010196677.9 (with English Translation).
Office Action issued on Jan. 27, 2011 in the corresponding Chinese Application No. 201010196534.8 (with English Translation).
Vast et al., *Journal of Fluorine Chemistry*, 38 (1988) 297-302.
Kongpricha et al., *Inorganic Chemistry*, vol. 6, No. 10, Oct. 1967, Notes 1915-1917.
Chinese Office Action issued Jan. 22, 2010 2005800502026 issued Jan. 22, 2010, 2005800502026 with English translation) previously filed Apr. 8, 2010—Re-submitted on Dec. 27, 2011 and listed on Form PTO-1449.
Korean Office Action issued Nov. 7, 2011, in Patent Application No. 10-2007-7029555 (with English-language translation).
Chinese Office Action issued Jan. 22, 2010, in Patent Application No. 2005800502026 (with English-language translation, previously filed Apr. 8, 2010).
Notice of Final Rejection issued Jul. 6, 2012 in Korean Patent Application No. 2007-7029555 (with English translation).
Extended European Search Report, Jan. 18, 2012 (Includes the Supplementary European Search Report and the European Search Opinion).
Christopher L. Campion, et al., "Suppression of Toxic Compounds Produced in the Decomposition of Lithium-Ion Battery Electrolytes", *Electrochemical and Solid-State Letters* ("*ECS*"), vol. 7, No. 7, Jan. 1, 2004, pp. A194-A197.
Li, W., et al., "Additives for Stabilizing $LiPF_6$-Based Electrolytes Against Thermal Decomposition", *Journal of the Electrochemical Society*, Manchester, New Hampshire, U.S., vol. 152, No. 7, Jan. 1, 2005, pp. A1361-A1365.
Office Action issued Oct. 5, 2012 in Korean Application No. 10-2007-7029555 (With English Translation).
Office Action issued Oct. 8, 2012 in Korean Application No. 10-2012-7020753 (With English Translation).
Office Action issued Jan. 31, 2013 in European Patent Application No. 05 805 456.0.
Korean Office Action issued Mar. 6, 2013, in Patent Application No. 10-2012-7031768 (with English-language translation).
Japanese Office Action issued Jan. 29, 2013, in Patent Application No. 2010-259852 (with English-language translation).
European Search report issued on Sep. 6, 2013 in European Application No. 13175306.3.
European Search report issued on Sep. 5, 2013 in European Application No. 13175315.4.
Ravdel, Boris et al. "Thermal Stability of Lithium-Ion Battery Electrolytes." Elsevier. Journal of Power Sources 119-121, (2003), pp. 805-810.
Communication pursuant to Article 94(3) EPC issued Jun. 10, 2014, in European Patent Application No. 13 175 315.4.
Communication pursuant to Article 94(3) EPC issued Jun. 11, 2014, in European Patent Application No. 13 175 306.3.
Office Action issued Jun. 4, 2013 in Japanese Patent Application No. 2010-259852 (with English language translation).
Office Action issued Jun. 4, 2013 in Japanese Patent Application No. 2010-259853 (with English language translation).

\* cited by examiner

METHOD FOR PRODUCING DIFLUOROPHOSPHATE, NON-AQUEOUS ELECTROLYTE FOR SECONDARY CELL AND NON-AQUEOUS ELECTROLYTE SECONDARY CELL

TECHNICAL FIELD

The present invention relates to a process for producing a difluorophosphate, a nonaqueous electrolyte for secondary batteries, and a nonaqueous-electrolyte secondary battery. More particularly, the invention relates to: a process for difluorophosphate production by which a nonaqueous electrolyte containing a difluorophosphate as an additive can be industrially advantageously prepared; a nonaqueous electrolyte for secondary batteries which contains a difluorophosphate produced by the process; and a nonaqueous-electrolyte secondary battery employing the nonaqueous electrolyte.

BACKGROUND ART

With the recent trend toward size reduction in electronic appliances, there is a desire for a further increase in the capacity of high-capacity secondary batteries. Attention is hence focused on lithium ion secondary batteries, which have a higher energy density than nickel-cadmium and nickel-hydrogen batteries.

Lithium secondary batteries employ a nonaqueous electrolyte obtained by dissolving an electrolyte such as, e.g., $LiPF_6$, $LiBF_4$, $LiClO_4$, $LiCF_3SO_3$, $LiAsF_6$, $LiN(CF_3SO_2)_2$, or $LiCF_3(CF_2)_3SO_3$ in a nonaqueous solvent such as a cyclic carbonate, e.g., ethylene carbonate or propylene carbonate, a linear carbonate, e.g., dimethyl carbonate, diethyl carbonate, or ethyl methyl carbonate, a cyclic ester, e.g., γ-butyrolactone or γ-valerolactone, a linear ester, e.g., methyl acetate or methyl propionate, a cyclic ether, e.g., tetrahydrofuran, 2-methyltetrahydrofuran, or tetrahydropyran, a linear ether, e.g., dimethoxyethane or dimethoxymethane, or a sulfur-containing organic solvent, e.g., sulfolane or diethyl sulfone.

Secondary batteries employing such nonaqueous electrolytes considerably differ in battery performance because reactivity varies depending on the compositions of the nonaqueous electrolytes. In particular, influences of the decomposition and side reactions of electrolytes on the cycle performance and storage performance of the secondary batteries have become problems. Attempts have hence been made to mitigate these problems by adding various additives to the electrolytes.

For example, patent document 1 describes a technique in which a nonaqueous electrolyte containing at least one additive selected from lithium monofluorophosphate ($Li_2PO_3F$) and lithium difluorophosphate ($LiPO_2F_2$) is employed. In this technique, the additive is reacted with lithium to form a coating film on the surface of the positive electrode and the negative electrode and thereby inhibit the electrolyte from decomposing due to contact with the positive-electrode active material and the negative-electrode active material. Self-discharge is thus inhibited and storage performance after charge is improved.

Patent document 2 describes a technique in which lithium carbonate is added as an additive to an electrolyte for lithium secondary batteries which has been prepared by dissolving a lithium salt in a nonaqueous solvent including a cyclic ester to thereby improve the charge/discharge characteristics of a battery. There is a statement in this document to the effect that by adding lithium carbonate to the electrolyte beforehand, the lithium carbonate generated by the reaction of the cyclic ester with lithium is prevented from dissolving, whereby lithium is inhibited from reacting with the solvent. Because of this, lithium carbonate is added to the electrolyte preferably in such an amount as to result in a supersaturated state to cause the additive to be present as lithium carbonate in the electrolyte and thereby maintain the effect of the invention.

Patent documents 2 and 3 include a statement to the effect that some kind of difluorophosphate is useful as an additive for an electrolyte for lithium batteries. However, patent document 3 includes a statement to the effect that addition of a salt mixture comprising lithium difluorophosphate and lithium monofluorophosphate results in poorer battery performances than in the case of adding sodium difluorophosphate. As apparent from these, details of the effect of that additive and conditions for the use thereof, e.g., as to what salt of difluorophosphoric acid is suitable, have not been fully elucidated.

Furthermore, non-patent document 1 includes a statement to the effect that when $CO_2$ or $Li_2CO_3$ is caused to be present as an additive in an $LiPF_6$ solution, then the lithium cycle efficiency improves and that $Li_2CO_3$ is an excellent coating agent.

Although those techniques can mitigate the problems in some degree, they are not always satisfactory. There is a desire for a proposal on a technique which is industrially advantageous and produces effects with higher certainty. In particular, it has been thought that a difluorophosphate can be produced by reacting, e.g., $P_2O_3F_4$ with a metal salt and $NH_3$ (see non-patent document 2 and non-patent document 3). This technique, however, has been extremely disadvantageous for use as an industrial-scale process for producing a difluorophosphate as an additive for nonaqueous electrolytes, because $P_2O_3F_4$ as a raw material is difficult to procure and exceedingly expensive and purification by-product separation is necessary.

Patent Document 1: JP-A-11-67270
Patent Document 2: JP-A-1-286263
Patent Document 3: Japanese Patent No. 3438085
Patent Document 4: JP-A-2004-31079
Non-Patent Document 1: *J. Electrochem. Soc.*, Vol. 143, No. 12, December 1996, pp. 3809-3820
Non-Patent Document 2: *J. Fluorine Chem.* (1988), 38(3), pp. 297-302
Non-Patent Document 3: *Inorganic Chemistry*, Vol. 6, No. 10, pp. 1915-1917 (1967)

DISCLOSURE OF THE INVENTION

Problems that the Invention is to Solve

Accordingly, an object of the invention is to provide: a process for industrially advantageously producing a difluorophosphate from easily available inexpensive raw materials; a nonaqueous electrolyte for secondary batteries which contains as an additive the difluorophosphate produced by the process; and a nonaqueous-electrolyte secondary battery employing the nonaqueous electrolyte.

Means for Solving the Problems

The invention provides a process for producing a difluorophosphate characterized by reacting a lithium hexafluorophosphate with a carbonate in a nonaqueous solvent.

The invention provides a nonaqueous electrolyte for secondary battery, which comprises a nonaqueous solvent containing at least a hexafluorophosphate as an electrolyte lithium salt and further containing a difluorophosphate, characterized in that at least part of the difluorophosphate is one supplied as a liquid reaction mixture resulting from a reaction of a lithium hexafluorophosphate with a carbonate in a nonaqueous solvent and containing a difluorophosphate.

The present inventors made intensive investigations in order to provide a technique for industrially advantageously producing a difluorophosphate for use as an additive for a nonaqueous electrolyte for secondary batteries and a method for inexpensively and easily preparing a nonaqueous electrolyte containing the difluorophosphate as an additive. As a result, they found that a difluorophosphate can be highly industrially advantageously produced by reacting lithium hexafluorophosphate, which is in common use as an electrolyte, with a carbonate which is industrially easily available and exceedingly inexpensive, in a nonaqueous solvent. In particular, they found that a nonaqueous electrolyte for secondary batteries which contains at least lithium hexafluorophosphate as an electrolyte lithium salt and further contains a difluorophosphate can be easily prepared at an exceedingly low cost by supplying at least part of the difluorophosphate as a liquid reaction mixture obtained by reacting lithium hexafluorophosphate with a carbonate in a nonaqueous solvent.

This method of electrolyte preparation was further investigated. As a result, the present inventors have found that when a solvent having a relative permittivity of 10 or higher is present in the nonaqueous solvent, then the reaction is retarded, and that use of a nonaqueous solvent having a relative permittivity lower than 10 is advantageous from the standpoint of reaction rate for efficiently yielding a difluorophosphate. They have further found that addition of a nonaqueous solvent having a relative permittivity of 10 or higher to the liquid reaction mixture gives a nonaqueous electrolyte having excellent performances. Furthermore, they have found that the electrolyte thus prepared can be used to produce a nonaqueous-electrolyte secondary battery having excellent performances. The invention has been achieved based on these findings.

Details of reaction mechanisms in the invention have not been elucidated. However, in the case where a hexafluorophosphate is reacted, for example, with lithium carbonate, the following reaction is thought to proceed apparently. There is a possibility that this reaction is catalyzed by water or HF.

$LiPF_6 + 2Li_2CO_3 \rightarrow LiPO_2F_2 + 2CO_2 + 4LiF$

The liquid reaction mixture obtained through this reaction hence comprises the nonaqueous solvent and the difluorophosphate, the fluoride salt, and carbon dioxide which are contained in the solvent.

Consequently, another embodiment of the nonaqueous electrolyte for secondary batteries of the invention is characterized by comprising a nonaqueous solvent which contains at least a hexafluorophosphate as an electrolyte lithium salt and further contains a difluorophosphate and a fluoride salt.

Another embodiment of the nonaqueous electrolyte for secondary batteries of the invention is characterized by comprising a nonaqueous solvent which contains at least a hexafluorophosphate as an electrolyte lithium salt and further contains a difluorophosphate and carbon dioxide.

Still another embodiment of the nonaqueous electrolyte for secondary batteries of the invention comprises a nonaqueous solvent containing at least a hexafluorophosphate as an electrolyte lithium salt and further containing lithium difluorophosphate, and is characterized in that the nonaqueous solvent is a mixed solvent composed of three or more nonaqueous solvent ingredients comprising both of cyclic carbonate and linear carbonate.

The nonaqueous electrolyte in which the nonaqueous solvent is a mixed solvent composed of three or more nonaqueous solvent ingredients comprising both of cyclic carbonate and linear carbonate is advantageous because this mixed solvent is less apt to solidify at low temperatures. In particular, this electrolyte which employs a linear carbonate having a low molecular weight and contains a difluorophosphate is preferred because when this electrolyte is used in a secondary battery, difluorophosphate anions approach the positive-electrode material to attract lithium ions and, hence, the low-temperature discharge characteristics are improved.

The invention further provides a nonaqueous-electrolyte secondary battery comprising such nonaqueous electrolyte of the invention for secondary batteries, a negative electrode capable of occluding and releasing lithium ions, and a positive electrode.

The invention furthermore provides a nonaqueous-electrolyte secondary battery characterized by comprising such nonaqueous electrolyte of the invention for secondary batteries, a negative electrode capable of occluding and releasing lithium ions, and a positive electrode, and by satisfying at least one requirement selected from the group consisting of the following (i), (ii), and (iii):

(i) an overall electrode area of the positive electrode is at least 20 times the surface area of the case of the secondary battery;
(ii) the secondary battery has a direct-current resistance component less than 10 milliohms (mΩ); and
(iii) the battery elements disposed in each battery case of the secondary battery have an electric capacity of 3 ampere-hours (Ah) or higher.

Incidentally, JP-A-1-286263 describes a technique in which lithium carbonate is added as an additive to an electrolyte for lithium secondary batteries prepared by dissolving a lithium salt in a nonaqueous solvent including a cyclic ester to thereby improve the charge/discharge characteristics of a battery. There is a statement in JP-A-1-286263 to the effect that lithium carbonate is added to an electrolyte beforehand to thereby prevent the lithium carbonate yielded by the reaction of the cyclic ester with lithium from dissolving, whereby lithium is inhibited from reacting with the solvent. Because of this, lithium carbonate is added to the electrolyte preferably in such an amount as to result in a supersaturated state to cause the additive to be present as lithium carbonate in the electrolyte and thereby maintain the effect of the invention disclosed in that document. Namely, the effect of that invention is obtained by causing the lithium carbonate to remain as it is in the electrolyte without reacting.

However, this technique cannot produce effects such as those of the present invention, as will be shown in Comparative Examples 2 and 4, which will be given later.

The causes of this are thought to be as follows. For yielding a difluorophosphate, it is necessary to sufficiently react lithium hexafluorophosphate with a carbonate. Furthermore, after the electrolyte has been introduced into a sealed battery, typical positive-electrode material, such as the lithium-transition metal oxide, such as a lithium-nickel composite oxide or lithium-cobalt composite oxide, and the typical negative-electrode material, such as a carbonaceous material or lithium metal, trap water and HF, which are thought to catalyze the reaction, and the reaction for yielding a difluorophosphate is hence inhibited.

Namely, for yielding a difluorophosphate, it is necessary to react beforehand lithium hexafluorophosphate with a carbonate in a nonaqueous solvent. Even when the nonaqueous electrolyte in which this reaction has not proceeded sufficiently is used in fabricating a secondary battery, the effects of the present invention cannot be obtained.

BEST MODE FOR CARRYING OUT THE INVENTION

Representative embodiments of the invention are given below to explain the invention in more detail.

First, the process of the invention for producing a difluorophosphate will be explained.

In the invention, lithium hexafluorophosphate is reacted with a carbonate in a nonaqueous solvent to thereby produce a difluorophosphate.

The carbonate is not particularly limited as long as it dissolves in the nonaqueous solvent and has reactivity with lithium hexafluorophosphate. However, use is generally made of one or more members selected from the group consisting of alkali metal salts, alkaline earth metal salts, and salts with $NR^1R^2R^3R^4$ (wherein $R^1$ to $R^4$ may be the same or different and each represent either an organic group having 1-12 carbon atoms or a hydrogen atom). These are raw materials especially advantageous for the production of a difluorophosphate for nonaqueous electrolytes.

The alkali metal is generally selected from the group consisting of Li, Na, K, Rb, and Cs. For sue in producing a difluorophosphate for nonaqueous electrolytes, Li, Na, and K are preferred of those alkali metals from the standpoints of cost and availability. From the standpoint of battery performance, Li and K are especially preferred. In particular, Li is more preferred from the standpoint of battery performance.

The alkaline earth metal is generally selected from the group consisting of Be, Mg, Ca, Sr, and Ba. For use in producing the salt for nonaqueous electrolytes, Mg, Ca, Sr, and Ba are preferred of those from the standpoints of cost and safety. From the standpoint of battery performance, Ca is especially preferred.

Examples of the organic groups $R^1$ to $R^4$ contained in the $NR^1R^2R^3R^4$ (wherein $R^1$ to $R^4$ may be the same or different and each represent an organic group having 1-12 carbon atoms or a hydrogen atom) generally include alkyl groups such as methyl, ethyl, propyl, and butyl, cycloalkyl groups such as cyclohexyl, and heterocyclic groups containing one or more nitrogen atoms, such as piperidyl, pyrrolidyl, pyridyl, and imidazolyl. Preferred of these are methyl and ethyl. The $NR^1R^2R^3R^4$ is not particularly limited as long as the salts dissolve in the nonaqueous solvent. However, it preferably is a tetraethylammonium group or a triethylmethylammonium group from the standpoint of solubility.

Those carbonates may be used alone or in combination of two or more thereof.

The nonaqueous solvent serving as a reaction medium is not limited. Generally, however, use can be made of one or more solvents selected from the group consisting of cyclic carbonates such as ethylene carbonate and propylene carbonate, linear carbonates such as dimethyl carbonate, diethyl carbonate, and ethyl methyl carbonate, cyclic esters such as γ-butyrolactone and γ-valerolactone, linear esters such as methyl acetate and methyl propionate, cyclic ethers such as tetrahydrofuran, 2-methyltetrahydrofuran, and tetrahydropyran, linear ethers such as dimethoxyethane and dimethoxymethane, and sulfur-containing organic solvents such as sulfolane and diethyl sulfone. From the standpoint of reaction rate, solvents having a low permittivity are preferred of these. In particular, the solvents having a relative permittivity of 10 or lower are preferred. Especially preferred are the solvents having a relative permittivity of 5 or lower.

Relative permittivity herein means the ratio of the permittivity of a substance $\epsilon$ to the permittivity of vacuum so, i.e., $\epsilon/\epsilon_0$. It generally depends on temperature. The term "a substance having a relative permittivity of 10 or higher" in the invention means a substance which, in a ligand state having a temperature of 20° C. or higher, can have a relative permittivity of 10 or higher. Likewise, the term "a substance having a relative permittivity lower than 10" means a substance which, in a liquid state having a temperature of 20° C. or higher, cannot have a relative permittivity of 10 or higher.

Examples of the nonaqueous solvent having a relative permittivity lower than 10 include linear carbonates such as dimethyl carbonate, diethyl carbonate, and ethyl methyl carbonate, linear esters such as methyl acetate and methyl propionate, cyclic ethers such as tetrahydrofuran, 2-methyltetrahydrofuran, and tetrahydropyran, and linear ethers such as dimethoxyethane and dimethoxymethane. These solvents may be used alone or as a mixture of two or more thereof.

More preferred of those solvents are linear carbonates. Especially preferred is a mixed solvent comprising dimethyl carbonate and ethyl methyl carbonate.

In the case where the liquid reaction mixture is to be supplied as a nonaqueous electrolyte, it is preferred that a nonaqueous solvent having a relative permittivity of 10 or higher should be mixed therewith after the reaction. Examples of the nonaqueous solvent having a relative permittivity of 10 or higher generally include cyclic carbonates such as ethylene carbonate and propylene carbonate and cyclic esters such as γ-butyrolactone and γ-valerolactone. By adding any of these nonaqueous solvents to the liquid reaction mixture after completion of the reaction, the reaction solution can be converted to an excellent nonaqueous electrolyte for secondary batteries. Those solvents also can be used alone or as a mixture of two or more thereof.

In the case where the liquid reaction mixture is to be used as a nonaqueous electrolyte, it is preferred that any of those nonaqueous solvents should be added so as to finally result in a mixed solvent comprising a cyclic carbonate, such as ethylene carbonate or propylene carbonate, and a linear carbonate, such as dimethyl carbonate, diethyl carbonate, or ethyl methyl carbonate.

The proportion in which the lithium hexafluorophosphate and the carbonate are subjected to the reaction is not particularly limited. However, from the standpoint of efficiently conducting the synthesis of a difluorophosphate, it is preferred that the lower limit of the molar ratio of the carbonate to the lithium hexafluorophosphate ($CO_3/PF_6$) be generally $1\times10^{-3}$ or higher, especially $3\times10^{-3}$ or higher, and the upper limit thereof be generally 2 or lower, especially 1 or lower.

Especially when the liquid reaction mixture to be obtained through the reaction is supplied as a difluorophosphate source to a nonaqueous electrolyte for secondary batteries, it is advantageous that the lower limit of the molar ratio of the carbonate to the lithium hexafluorophosphate ($CO_3/PF_6$) is generally $5\times10^{-3}$ or higher, especially $1\times10^{-2}$ or higher, and the upper limit thereof is generally 1.6 or lower, especially 1.2 or lower. In the case where the liquid reaction mixture by itself is to be used as a nonaqueous electrolyte, the upper limit of that molar ratio is preferably 0.8 or lower, especially 0.6 or lower.

The concentration of the lithium hexafluorophosphate subjected to the synthesis is not particularly limited. However, it is preferred that the lower limit of the concentration thereof in the nonaqueous solvent should be generally 0.3 mol/kg or higher, especially 0.5 mol/kg or higher, and the upper limit thereof should be generally 2.5 mol/kg or lower, especially 2.0 mol/kg or lower. In case where the concentration thereof is lower than the lower limit, the rate of reaction is apt to decrease. In case where the concentration thereof exceeds the upper limit, side reactions are apt to proceed. The amount of the carbonate to be subjected to the synthesis is not particularly limited. However, the lower limit thereof is generally $2 \times 10^{-3}$ mol or larger, especially preferably $5 \times 10^{-3}$ mol or larger, per kg of the nonaqueous solvent. The upper limit thereof is generally 4 mol or smaller, especially preferably 3 mol or smaller. In case where the amount of the carbonate is smaller than the lower limit, a sufficient amount of a difluorophosphate is difficult to obtain. When the amount thereof exceeds the upper limit, there are cases where side reactions proceed.

Especially when the liquid reaction mixture to be obtained through the reaction is supplied as a difluorophosphate source to a nonaqueous electrolyte for secondary batteries, the lower limit of the concentration of lithium hexafluorophosphate in the nonaqueous solvent is generally preferably 0.5 mol/L or higher, especially 0.7 mol/L or higher, and the upper limit thereof is generally preferably 2.0 mol/L or lower, especially 1.6 mol/L or lower. This is because the more the concentration thereof is close to a value suitable for nonaqueous electrolytes, the higher the handleability.

Furthermore, when the liquid reaction mixture to be obtained through the reaction is supplied as a difluorophosphate source to a nonaqueous electrolyte for secondary batteries, the lower limit of the amount of the carbonate to be used is generally preferably $2 \times 10^{-3}$ mol or larger, especially 0.01 mol or larger, per kg of the nonaqueous solvent, and the upper limit thereof is generally preferably mol or smaller, especially 0.8 mol or smaller. Especially when the liquid reaction mixture by itself is to be used as a nonaqueous electrolyte, the upper limit of the amount of the carbonate is preferably 0.6 mol or smaller. In case where the amount of the salt is smaller than the lower limit, use of the resultant liquid reaction mixture as a nonaqueous electrolyte is less apt to produce the effect of the additive. When the amount thereof exceeds the upper limit, there are cases where side reactions are apt to proceed.

In the reaction for yielding a difluorophosphate, the presence of a nonaqueous solvent, lithium hexafluorophosphate, and a carbonate generally suffices for the progress of the reaction. It is, however, noted that the reaction proceeds rapidly when a slight amount of water is present, although the mechanism of this has not been elucidated. Consequently, in the case where the liquid reaction mixture is to be supplied to a nonaqueous electrolyte, water may be caused to coexist in the reaction system in such a slight amount as not to influence battery performances, e.g., in an amount of about 10-200 ppm in terms of concentration in the electrolyte.

Reaction temperature and reaction time are not particularly limited and optimal ones may be selected according to circumstances. However, the following are preferred.

With respect to temperature, there are no particular limitations as long as the reaction proceeds. However, the reaction proceeds rapidly at temperatures higher than ordinary temperature. The lower limit of the reaction temperature is generally 20° C. or higher, especially 30° C. or higher, more preferably 40° C. or higher. The upper limit thereof is generally 85° C. or lower, especially preferably 70° C. or lower. In case where the reaction temperature is lower than the lower limit, the reaction is less apt to proceed. Reaction temperatures exceeding the upper limit are disadvantageous in that the solvent is apt to vaporize and the $LiPF_6$ is apt to decompose. It is, however, important that when the reaction temperature is relatively low, a sufficient reaction time should be secured.

With respect to time period also, there are no particular limitations as long as the reaction proceeds. Although the reaction may be caused to proceed until a difluorophosphate is yielded in a desired amount, the lower limit of the reaction time is generally 2 hours or longer, especially 5 hours or longer. For example, a time period of 24 hours or longer or 6 hours or longer is necessary at 30° C. or 40° C., respectively. When the reaction time is shorter than the lower limit, the reaction is less apt to be completed and there are cases where a difluorophosphate is not obtained in a desired amount. Although there is no particular upper limit on the reaction time, a time period as long as several days is undesirable from the standpoint of productivity because such a reaction is poor in efficiency.

In the case where a nonaqueous solvent having a relative permittivity lower than 10 is used as a reaction solvent, the reaction temperature desirably is generally from 30° C. to 85° C., preferably from 40° C. to 70° C. The reaction time desirably is generally from 30 minutes to 10 hours, preferably from 1 hour to 8 hours. Thus, by using a nonaqueous solvent having a relative permittivity lower than 10, the reaction of lithium hexafluorophosphate with a carbonate in the invention can be conducted especially efficiently.

The liquid reaction mixture thus obtained comprises the nonaqueous solvent containing the lithium hexafluorophosphate and carbonate which remain unreacted and further containing a difluorophosphate, a fluoride, and carbon dioxide which have been yielded by the reaction.

In the case where the difluorophosphate is isolated from the liquid reaction mixture, methods for isolation are not particularly limited and any technique such as, e.g., distillation or recrystallization can be used as long as the difluorophosphate does not decompose. However, the difluorophosphate obtained can be used without being isolated from the liquid reaction mixture according to purposes, for example, as in the case where it is to be used in a nonaqueous electrolyte for secondary batteries as will be described later. This is industrially exceedingly advantageous because an isolation step can be omitted.

The liquid reaction mixture comprises the lithium hexafluorophosphate and carbonate which remain unreacted, a fluoride salt and carbon dioxide which have been generated as by-products, and the nonaqueous solvent besides the target difluorophosphate. However, lithium hexafluorophosphate is a substance usable as an electrolyte in nonaqueous electrolytes for secondary batteries. Consequently, in the case where a nonaqueous electrolyte for secondary batteries which, for example, comprises a nonaqueous solvent containing at least a hexafluorophosphate as an electrolyte lithium salt and further containing a difluorophosphate is to be prepared, a liquid reaction mixture usable as a difluorophosphate source for the nonaqueous electrolyte can be obtained by selecting as the reaction solvent a nonaqueous solvent which may be used as a nonaqueous solvent for the electrolyte. In the case where the liquid reaction mixture is to be used as part of the electrolyte, the concentrations of ingredients in this liquid reaction mixture are preferably as follows.

The lower limit of the concentration of the difluorophosphate in the liquid reaction mixture is generally $1 \times 10^{-3}$ mol/kg or higher, especially $5 \times 10^{-3}$ mol/kg or higher, in particular $1 \times 10^{-2}$ mol/kg or higher, and the upper limit thereof is generally 0.7 mol/kg or lower, especially 0.6 mol/kg or lower. The lower limit of the concentration of the residual lithium hexafluorophosphate in the liquid reaction mixture is generally 0.2 mol/kg or higher, especially 0.3 mol/kg or higher, and the upper limit thereof is generally 1.8 mol/kg or lower, especially 1.5 mol/kg or lower. Furthermore, with respect to the concentration of the residual carbonate in the liquid reaction mixture, there is no lower limit thereon and the concentration may be 0. The upper limit thereof is generally 0.02 mol/kg or lower, especially 0.01 mol/kg or lower.

On the other hand, the fluoride salt generated as a by-product of the reaction has dissolved in the nonaqueous solvent but the part thereof outside the solubility precipitates. The fluoride salt which has precipitated can be removed by filtration, and the concentration of the part dissolved can be regulated by, e.g., the operation of diluting the liquid reaction mixture. For use in a nonaqueous electrolyte for secondary batteries, the content of the fluoride salt is preferably as follows from the standpoint of the storage performance at the elevated temperature and thermal stability of batteries. The upper limit of the concentration of the salt in the electrolyte is generally 0.15 mol/kg or lower, especially 0.1 mol/kg or lower, and the lower limit thereof is generally $2\times10^{-3}$ mol/kg or higher, preferably $3\times10^{-3}$ mol/kg or higher. Furthermore, from the standpoint of recovery capacity after high-temperature storage, it is preferred that the amount of carbon dioxide determined by the following method should be 300 ppm or larger.

The amount of carbon dioxide in an electrolyte can be determined in the following manner. In an argon box, 0.3 mL of the electrolyte is placed in a vial bottle having a capacity of 6 mL and this bottle is closed and heated at 60° C. for 20 minutes. Thereafter, the gas-phase part is sampled in an amount of 0.5 mL and examined by gas chromatography for carbon dioxide. The amount of the carbon dioxide present in the argon box used (blank) is determined in the same manner. The value for the blank is subtracted from the measured value for the bottle containing the electrolyte, whereby the amount of the carbon dioxide contained in the electrolyte can be determined.

The measured values of carbon dioxide amount in Examples 5 and 6, Reference Example 2, and Comparative Example 5, which will be given later, are values thus obtained.

Consequently, in the case where the liquid reaction mixture to be obtained through the reaction is supplied as a difluorophosphate source to a nonaqueous electrolyte for secondary batteries, it is preferred in the process for difluorophosphate production of the invention that the amounts of the lithium hexafluorophosphate and carbonate to be subjected to the reaction should be regulated so as to result in a liquid reaction mixture in which the concentrations of the difluorophosphate, lithium hexafluorophosphate, carbonate, and fluoride salt are the respective values shown above. It is also preferred to regulate the concentration of each ingredient, e.g., the difluorophosphate, according to need by suitably removing the nonaqueous solvent from the liquid reaction mixture by distillation or another operation to concentrate the mixture or, conversely, by diluting the liquid reaction mixture with a nonaqueous solvent. Moreover, it is preferred to suitably add a solute ingredient, e.g., lithium hexafluorophosphate.

Namely, that a liquid reaction mixture resulting from the reaction of lithium hexafluorophosphate with a carbonate in a nonaqueous solvent is supplied as at least part of the difluorophosphate in the nonaqueous electrolyte of the invention for secondary batteries includes: the case where the liquid reaction mixture obtained is supplied as it is; and the case where the liquid reaction mixture is used after the concentration of, e.g., the difluorophosphate is regulated by suitably removing the nonaqueous solvent by an operation such as distillation or extraction to concentrate the mixture or, conversely, by diluting the liquid reaction mixture with a nonaqueous solvent or after the concentration of an ingredient is regulated by suitably adding a solute ingredient, e.g., lithium hexafluorophosphate.

The nonaqueous electrolyte of the invention for secondary batteries is explained below.

The nonaqueous electrolyte of the invention for secondary batteries is one which comprises a nonaqueous solvent containing at least a hexafluorophosphate as an electrolyte lithium salt and further containing a difluorophosphate, and in which the liquid reaction mixture described above, which resulted from the process for difluorophosphate production of the invention, is used as the difluorophosphate.

Incidentally, it is a matter of course that after lithium hexafluorophosphate is reacted with a carbonate in a nonaqueous solvent in the process for difluorophosphate production of the invention, the difluorophosphate may be isolated from the resultant liquid reaction mixture and used as an additive for nonaqueous electrolytes for secondary batteries. However, when the liquid reaction mixture resulting from the reaction of lithium hexafluorophosphate with a carbonate in a nonaqueous solvent and containing a difluorophosphate is supplied as it is, the step of separation and purification can be omitted. This method is hence exceedingly industrially advantageous. As stated above, this liquid reaction mixture contains the difluorophosphate and fluoride salt yielded and further contains the lithium hexafluorophosphate and carbonate when these ingredients remain. In this case, the nonaqueous electrolyte of the invention for secondary batteries hence comprises a nonaqueous solvent which contains at least a hexafluorophosphate as an electrolyte lithium salt and further contains the difluorophosphate, the fluoride salt, and carbon dioxide. The electrolyte preferably is one which contains no lithium monofluorophosphate.

The constituent ingredients and proportions thereof in the nonaqueous electrolyte of the invention for secondary batteries, including one to which the liquid reaction mixture described above is supplied, are preferably as follows.

Examples of the nonaqueous solvent for use in the nonaqueous electrolyte of the invention for secondary batteries include cyclic carbonates such as ethylene carbonate, propylene carbonate, and butylene carbonate, linear carbonates such as dimethyl carbonate, diethyl carbonate, and ethyl methyl carbonate, cyclic esters such as γ-butyrolactone and γ-valerolactone, linear esters such as methyl acetate and methyl propionate, cyclic ethers such as tetrahydrofuran, 2-methyltetrahydrofuran, and tetrahydropyran, linear ethers such as dimethoxyethane and dimethoxymethane, and sulfur-containing organic solvents such as sulfolane and diethyl sulfone. These solvents may be used as a mixture of two or more thereof.

The nonaqueous solvent preferably is a mixed solvent which comprises at least 20% by volume cyclic carbonate selected from the group consisting of alkylene carbonates in which the alkylene group has 2-4 carbon atoms and at least 20% by volume linear carbonate selected from the group consisting of dialkyl carbonates in which each alkyl group has 1-4 carbon atoms, these carbonates accounting for 70% by volume or more of the whole mixed solvent. This is because this mixed solvent enhances the whole battery performances including charge/discharge characteristics and battery life.

Examples of the alkylene carbonates in which the alkylene group has 2-4 carbon atoms include ethylene carbonate, propylene carbonate, and butylene carbonate. Preferred of these are ethylene carbonate and propylene carbonate.

Examples of the dialkyl carbonates in which each alkyl group has 1-4 carbon atoms include dimethyl carbonate, diethyl carbonate, di-n-propyl carbonate, ethyl methyl carbonate, methyl n-propyl carbonate, and ethyl n-propyl carbonate. Preferred of these are dimethyl carbonate, diethyl carbonate, and ethyl methyl carbonate.

The mixed nonaqueous solvent comprising a cyclic carbonate and a linear carbonate may contain a solvent other than carbonates. The nonaqueous solvent may contain a solvent other than carbonates, e.g., cyclic carbonates and linear carbonates, in an amount of generally up to 30% by weight, preferably up to 10% by weight, as long as this does not lower battery performances.

The nonaqueous electrolyte in which the nonaqueous solvent is a mixed solvent composed of three or more nonaqueous solvent ingredients comprising both of cyclic carbonate and linear carbonate is advantageous because this mixed solvent is less apt to solidify at low temperatures. In particular, this electrolyte which employs a linear carbonate having a low molecular weight and contains a difluorophosphate is preferred because when this electrolyte is used in a secondary battery, difluorophosphate anions approach the positive-electrode material to attract lithium ions and, hence, the low-temperature discharge characteristics are improved.

Examples of preferred solvent combinations include:
(1) a combination of ethylene carbonate (EC), dimethyl carbonate (DMC), and diethyl carbonate (DEC),
(2) a combination of ethylene carbonate (EC), dimethyl carbonate (DMC), and ethyl methyl carbonate (EMC), and
(3) a combination of ethylene carbonate (EC), ethyl methyl carbonate (EMC), and diethyl carbonate (DEC).

Especially preferred of those nonaqueous-solvent combinations are (1) a combination of ethylene carbonate (EC), dimethyl carbonate (DMC), and diethyl carbonate (DEC) and (2) a combination of ethylene carbonate (EC), dimethyl carbonate (DMC), and ethyl methyl carbonate (EMC). Also preferred is one comprising all of the four solvents, i.e., ethylene carbonate (EC), dimethyl carbonate (DMC), ethyl methyl carbonate (EMC), and diethyl carbonate (DEC).

The nonaqueous electrolyte of the invention for secondary batteries is useful especially when lithium hexafluorophosphate ($LiPF_6$) is used as an electrolyte lithium salt. However, it is possible to use a mixture of lithium hexafluorophosphate with one or more other lithium salts. Although such lithium salts are not particularly limited, use may be generally made of one or more salts selected from inorganic lithium salts such as $LiClO_4$, $LiBF_4$, $LiAsF_6$, and $LiSbF_6$ and organic lithium salts such as $LiCF_3SO_3$, $LiN(CF_3SO_2)_2$, $LiN(CF_3CF_2SO_2)_2$, $LiN(CF_3SO_2)$ $(C_4F_9SO_2)$, and $LiC(CF_3SO_2)$ 3-Especially preferred is one selected from $LiClO_4$ and $LiBF_4$.

From the standpoints of electrical conductivity and viscosity, the concentration of the electrolyte lithium salt in the electrolyte is preferably regulated so that the upper limit thereof is generally 2 mol/L or lower, especially 1.5 mol/L or lower, and the lower limit thereof is generally 0.5 mol/L or higher, preferably 0.7 mol/L or higher.

The difluorophosphate contained in the nonaqueous electrolyte of the invention for secondary batteries is of the same kind as the difluorophosphate produced by the process for difluorophosphate production of the invention, i.e., one derived from the carbonate used in the process for difluorophosphate production of the invention. The salt preferably is one selected from the group consisting of alkali metal salts, alkaline earth metal salts, and salts with $NR^1R^2R^3R^4$ (wherein $R^1$ to $R^4$ may be the same or different and each represent either an organic group having 1-12 carbon atoms or a hydrogen atom). These salts may be used alone or in combination of two or more thereof.

It is desirable that such a difluorophosphate should be present in the nonaqueous electrolyte in such a concentration that the lower limit thereof is generally $1 \times 10^{-3}$ mol/kg or higher, especially $3 \times 10^{-3}$ mol/kg or higher, preferably $1 \times 10^{-2}$ mol/kg or higher, and the upper limit thereof is generally 0.5 mol/kg or lower, especially 0.3 mol/kg or lower, preferably 0.15 mol/kg or lower. In case where the concentration thereof exceeds the upper limit, the solution tends to have an increased viscosity. When the concentration thereof is lower than the lower limit, there are cases where the effect of improving cycle performance is difficult to obtain.

As stated above, use of the liquid reaction mixture resulting from the reaction of lithium hexafluorophosphate with a carbonate in preparing the nonaqueous electrolyte results in a possibility that the carbonate might come into the electrolyte. It is preferred that the upper limit of the concentration of the carbonate in the nonaqueous electrolyte should be generally $1 \times 10^{-3}$ mol/kg or lower, especially $8 \times 10^{-4}$ mol/kg or lower. There is no particular lower limit. Even when the salt is present in a concentration of about $5 \times 10^{-4}$ mol/kg, it exerts especially no influence and is acceptable. Although concentrations thereof exceeding the upper limit do not lessen the effects of the invention, such high concentrations are wasteful and poor in efficiency.

In the nonaqueous electrolyte of the invention, any desired additives can be used in desired proper amounts. Examples of such additives include overcharge inhibitors such as cyclohexylbenzene and biphenyl, agents for forming negative-electrode coatings such as vinylene carbonate, vinylethylene carbonate, fluoroethylene carbonate, and succinic anhydride, and positive-electrode-protecting agents such as ethylene sulfite, propylene sulfite, dimethyl sulfite, propanesultone, butanesultone, methyl methanesulfonate, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, thioanisole, diphenyl disulfide, and dipyridinium disulfide.

As stated above, the difluorophosphate-containing solution provided as a liquid reaction mixture resulting from the reaction of lithium hexafluorophosphate with a carbonate can be used for preparing the electrolyte. In this case, not only the liquid reaction mixture by itself can be used as the electrolyte, but also it is possible to suitably add a solvent, an electrolyte, and additives thereto according to any desired design. For example, although there are cases where the liquid reaction mixture contains a reduced amount of lithium hexafluorophosphate depending on the feed amount thereof, this compound may be added later to optimize the concentration thereof. It is also possible to use the liquid reaction mixture as an additive for the electrolyte. In this case, when the nonaqueous solvent used as a reaction medium has the same composition as the solvent in the electrolyte, handling is easy.

The nonaqueous-electrolyte secondary battery of the invention, which employs the nonaqueous electrolyte of the invention for secondary batteries, will be explained next.

The active material of the negative electrode as a component of the secondary battery of the invention is not particularly limited as long as it comprises a material capable of occluding and releasing lithium. Examples thereof include pyrolysis products obtained by pyrolyzing organic substances under various pyrolysis conditions, artificial graphite, and natural graphite. Preferred materials which are mainly used are artificial graphite produced by the high-temperature heat treatment of an easily graphitizable pitch obtained from any of various raw materials, purified natural graphite, and materials obtained by subjecting these graphites to any of various surface treatments including pitch treatment. These graphite materials preferably are ones in which the value of d (interplanar spacing) for the lattice plane (002), as determined by X-ray diffractometry in accordance with the method of the Japan Society for Promotion of Scientific Research, is 0.335-0.34 nm, more preferably 0.335-0.337 nm. It is preferred that those graphite materials have an ash content of 1% by weight or lower, more preferably 0.5% by weight or lower, most preferably 0.1% by weight or lower, and a crystallite size (Lc), as determined by X-ray diffractometry in accordance with the method of the Japan Society for Promotion of Scientific Research, of 30 nm or larger. The crystalline size (Lc) thereof is more preferably 50 nm or larger, most preferably 100 nm or larger.

The median diameter of each of those graphite materials, in terms of median diameter determined by the laser diffraction/scattering method, is from 1 μm to 100 μm, preferably from 3 μm to 50 μm, more preferably from 5 μm to 40 μm, even more preferably from 7 μm to 30 μm. The BET specific surface area of each graphite material is from 0.5 m$^2$/g to 25.0 m$^2$/g, preferably from 0.7 m$^2$/g to 20.0 m$^2$/g, more preferably from 1.0 m$^2$/g to 15.0 m$^2$/g, even more preferably from 1.5 m$^2$/g to 10.0 m$^2$/g. Furthermore, each graphite material preferably is one in which, in analysis by Raman spectroscopy with argon ion laser light, the intensity ratio R between the peak $P_A$ in the range of 1,580-1,620 cm$^{-1}$ (peak intensity $I_A$) and the peak $P_B$ in the range of 1,350-1,370 cm$^{-1}$ (peak intensity $I_B$), which is expressed by $R=I_B/I_A$, is from 0 to 0.5 and the half-value width of the peak in the range of 1,580-1,620 cm$^{-1}$ is 26 cm$^{-1}$ or smaller. The half-value width of the peak in the range of 1,580-1,620 cm$^{-1}$ is more preferably 25 cm$^{-1}$ or smaller.

Also preferred is a graphitic/amorphous composite material obtained by mixing a graphite material with an amorphous material or coating a graphite material with an amorphous material. For producing such a graphitic/amorphous composite material, use can be made, for example, of a method in which a carbon precursor for obtaining an amorphous material therefrom is mixed as it is with a graphitic powder and this mixture is heat-treated and then pulverized to obtain a composite powder; a method in which the amorphous powder produced beforehand is mixed with a graphitic powder and this mixture is heat-treated to combine the two materials; or a method which comprises producing the amorphous powder beforehand, mixing a graphitic powder, the amorphous powder, and a carbon precursor, and heat-treating the mixture to combine these materials. In the latter two methods, in which an amorphous powder is prepared beforehand, it is preferred to use amorphous particles having an average particle diameter which is up to one-tenth the average particle diameter of the graphitic particles.

A general procedure is as follows. Such graphitic particles or a mixture of graphitic particles and amorphous particles is mixed with a carbon precursor, and the resultant mixture is heated to obtain an intermediate. Thereafter, the intermediate is carbonized/burned and pulverized, whereby a graphitic/amorphous composite powder comprising graphite particles and an amorphous material combined therewith can be finally obtained. The proportion of the amorphous material in such a graphitic/amorphous composite powder is preferably regulated to 50% by weight or lower, preferably 25% by weight or lower, more preferably 15% by weight or lower, especially preferably 10% by weight or lower, and to 0.1% by weight or higher, preferably 0.5% by weight or higher, more preferably 1% by weight or higher, especially preferably 2% by weight or higher.

A process for obtaining such a graphitic/amorphous composite powder is generally divided into the following four steps.

First Step: Graphitic particles or a powder mixture of graphitic particles and amorphous particles is mixed with a carbon precursor and optionally with a solvent by means of any of various commercial mixers, kneaders, etc. to obtain a mixture.

Second Step: According to need, the mixture is heated with stirring to obtain an intermediate from which the solvent has been removed.

Third Step: The mixture or the intermediate is heated at a temperature of from 700° C. to 2,800° C. in an inert gas atmosphere such as nitrogen gas, carbon dioxide gas, or argon gas to obtain a graphitic/amorphous composite material.

Fourth Step: According to need, the composite material is subjected to powder processings such as pulverization, disaggregation, and classification.

Of these steps, the second step and the fourth step can be omitted in some cases. The fourth step may be conducted before the third step.

With respect to conditions for the heat treatment in the third step, heat history temperature conditions are important. The lower limit of the temperature is generally 700° C. or higher, preferably 900° C. or higher, although it changes slightly with the kind of the carbon precursor and the heat history thereof. On the other hand, with respect to upper-limit temperature, the mixture or intermediate can be heated basically to a temperature at which it does not come to have a higher structural order than the crystal structure of the graphite particle nuclei. Consequently, the upper-limit temperature of the heat treatment is generally 2,800° C. or lower, preferably 2,000° C. or lower, more preferably 1,500° C. or lower. Heating rate, cooling rate, heat treatment period, and the like, among conditions of such heat treatment, can be determined at will according to purposes. It is also possible to conduct a heat treatment in a relatively low-temperature region and then heat the work to a given temperature. The reactor to be used in the steps may be of the batch type or the continuous type, and one reactor or two or more reactors may be used.

It is preferred that the material thus obtained by combining an amorphous material with a graphitic material should have a crystallinity not higher than that of the graphitic material with respect to the value of peak intensity ratio R and half-value width $\Delta_v$ of the peak around 1,580 cm$^{-1}$ in Raman spectroscopy and the values of d002 and Lc obtained from a diffraction pattern in X-ray wide-angle diffractometry. Namely, it is preferred that the value of R thereof should be not smaller than that of the graphitic material, the half-value width $\Delta_v$ thereof be not smaller than that of the graphitic material, the value of d002 thereof be not smaller than that of the graphitic material, and the Lc thereof is not larger than that of the graphitic material. Specific examples of the value of R of the graphitic/amorphous composite powdery material include one which is in the range of from 0.01 to 1.0, preferably from 0.05 to 0.8, more preferably from 0.2 to 0.7, even more preferably from 0.3 to 0.5, and is not smaller than the value for the graphitic material serving as the base.

A mixture of any of those carbonaceous materials with another negative-electrode material capable of occluding and releasing lithium is also usable. Examples of the negative-electrode material capable of occluding and releasing lithium, other than carbonaceous materials, include metal oxide materials such as tin oxide and silicon oxide, lithium metal, various lithium alloys, and metallic materials capable of forming an alloy with lithium, such as silicon and tin. These negative-electrode materials may be used as a mixture of two or more thereof.

The active material of the positive electrode as a component of the secondary battery of the invention is not particularly limited. Preferably, however, a lithium-transition metal composite oxide is used. Examples of such a material include lithium-cobalt composite oxides such as $LiCoO_2$, lithium-nickel composite oxides such as $LiNiO_2$, and lithium-manganese composite oxides such as $LiMnO_2$. From the standpoint of improving low-temperature discharge characteristics, lithium-cobalt composite oxides and lithium-nickel composite oxides are preferred of these. Those lithium-transition metal composite oxides may be stabilized by replacing part of the transition metal element as a main component by another metallic species, such as Al, Ti, V, Cr, Mn, Fe, Co, Li, Ni, Cu, Zn, Mg, Ga, Zr, or Si, and the composite oxides thus stabilized are preferred. Those positive-electrode active materials may be used in combination of two or more thereof.

Methods for producing the positive electrode and negative electrode are not particularly limited. For example, the positive or negative electrode can be produced by adding a binder, thickener, conductive material, solvent, etc. according to need to the active material described above to prepare a slurry, applying the slurry to a current collector as a base, and drying the slurry applied. Furthermore, use may be made of a method in which the active material by itself is formed into a sheet electrode by rolling or is formed into a pellet electrode by compression molding.

The layer thickness of the active electrode material in the case of the positive electrode desirably is generally from 3 μm to 1,000 μm, preferably from 5 μm to 200 μm. The layer thickness thereof in the case of the negative electrode desirably is generally from 1 μm to 400 μm, preferably from 3 μm to 200 μm. In the case where an active-material layer is formed on each side of a current collector, the thickness thereof on each side is within that range.

The binder is not particularly limited as long as it is stable to the solvent to be used in electrode production and to the electrolyte. Examples thereof include poly(vinylidene fluoride), polytetrafluoroethylene, styrene/butadiene rubbers, isoprene rubbers, and butadiene rubbers.

Examples of the thickener include carboxymethyl cellulose, methyl cellulose, hydroxymethyl cellulose, ethyl cellulose, poly(vinyl alcohol), oxidized starch, phosphorylated starch, and casein.

Examples of the conductive material include metallic materials such as copper and nickel and carbon materials such as graphite and carbon black. Especially with respect to the positive electrode, it is preferred to incorporate a conductive material thereinto.

The solvent may be either an aqueous or water-miscible one or an organic one. Examples of the aqueous or water-miscible solvent include water and alcohols. Examples of the organic solvent include N-methylpyrrolidone (NMP) and toluene.

As the material of the current collector for the negative electrode, use may be made of a metal such as copper, nickel, or stainless steel. A copper foil is preferred of these from the standpoints of ease of processing into a thin film and cost. As the material of the current collector for the positive electrode, use may be made of a metal such as aluminum, titanium, or tantalum. An aluminum foil is preferred of these from the standpoints of ease of processing into a thin film and cost.

In the secondary battery, a separator is generally interposed between the positive electrode and the negative electrode. There are no particular limitations on the material and shape of the separator to be used in the secondary battery of the invention. However, it is preferred to select one from materials which are stable to the electrolyte and have excellent liquid retentivity. It is preferred to employ a porous sheet, nonwoven fabric, or the like produced from a polyolefin such as polyethylene or polypropylene.

Methods for producing the secondary battery of the invention, which comprises a negative electrode, a positive electrode, and the nonaqueous electrolyte, are not particularly limited. A suitable one can be selected from methods in common use.

The type of the battery also is not particularly limited. Usable are a cylinder type in which sheet electrodes and a separator are spirally disposed, a cylinder type of an inside-out structure comprising a combination of pellet electrodes and a separator, a coin type in which pellet or sheet electrodes and a separator are stacked, a laminate type comprising superposed layers of sheet electrodes and a separator, and the like. Methods for fabricating the battery also are not particularly limited, and a suitable one can be selected from various methods in general use according to the intended battery type.

The battery shape is not particularly limited. Examples thereof include a bottomed cylindrical shape, bottomed prismatic shape, thin shape, sheet shape, and paper shape. From the standpoint of heightening volume efficiency and thereby enhancing suitability for mounting for incorporation into a system or appliance, the battery may have a modified shape suitable for mounting in peripheral systems to be disposed around the battery, such as a horse shoe shape or comb shape. From the standpoint of efficiently radiating the internal heat of the battery outward, a prismatic shape having at least one side which is relatively flat and has a large area is preferred.

In the battery of a bottomed cylindrical shape, the area of the outer surface is small for the power-generating elements packed. It is therefore preferred to employ a design which enables the Joule's heat generated upon charge or discharge due to internal resistance to efficiently escape outward. It is also preferred to design the battery so that a material having high thermal conductivity is packed in a higher proportion to enable the battery to have a narrower temperature distribution inside.

An especially preferred battery constitution in the case of using the electrolyte of the invention, which contains a difluorophosphate, is as follows. The secondary battery of the invention preferably is one which satisfies at least one requirement selected from the following battery constitution requirements. Especially preferred is one which satisfies all the requirements.

With respect to the positive electrode described above, it is preferred that the area of the positive-electrode active-material layer relative to the outer surface area of the battery case is large from the standpoint of enhancing the effects of the invention, especially output characteristics. Specifically, the overall electrode area of the positive electrode is preferably at least 20 times, more preferably at least 40 times, the surface area of the case of the secondary battery. This regulation is preferred also from the standpoint of enhancing high-temperature stability. The term outer surface area of the case, in the case of a bottomed prismatic shape, means that total area of the case part packed with power-generating elements and excluding the terminal projections which is calculated from the length, width, and thickness dimensions thereof. In the case of a bottomed cylindrical shape, the outer surface area means a geometric surface area determined by approximation to a cylinder corresponding to the case part packed with power-generating elements and excluding the terminal projection. The term overall electrode area of the positive electrode means the geometric surface area of the positive-electrode mix layer facing the mix layer containing a negative-electrode active material. In a constitution in which a positive-electrode mix layer has been formed on each side of a current collector foil, that term means the sum of the areas calculated respectively for both sides.

The positive electrode is designed to have a discharge capacity (the electric capacity of the battery elements packed in one secondary-battery case) of preferably from 3 Ah to less than 20 Ah, more preferably from 4 Ah to less than 10 Ah, as measured through discharge from a fully charged state. When the discharge capacity thereof is lower than 3 Ah, there are cases where discharge at a high current results in a large voltage decrease due to electrode reaction resistance, leading to an impaired power efficiency. When the discharge capacity thereof is 20 Ah or higher, electrode reaction resistance is low and the power efficiency is satisfactory. In this case, however, the heat generation in the battery during pulse charge/discharge results in a wide temperature distribution and in poor durability in repetitions of charge/discharge. In addition, the efficiency of heat dissipation in the case of abrupt heat generation in an abnormality, such as overcharge or internal short-circuiting, is also poor and there are cases where the probability that the poor heat dissipation efficiency leads to a phenomenon in which the internal pressure increases and the gas release valve works (valve working) or a phenomenon in which the battery contents are vigorously ejected outside (rupture) increases.

The electrode group may be either one having a multilayer structure in which the positive electrode and negative electrode described above have been superposed through the separator described above or one having a structure in which the positive electrode and negative electrode described above have been spirally wound through the separator described above.

The proportion of the volume of the electrode group in the internal volume of the battery (hereinafter referred to as electrode group proportion) is regulated to preferably from 40% to 90%, more preferably from 50% to 80%. In case where the electrode group proportion is lower than 40%, a decrease in battery capacity results. In case where the electrode group proportion exceeds 90%, this battery has a reduced space volume and battery heating-up causes members to expand and an electrolyte ingredient to have a heightened vapor pressure, resulting in an increased internal pressure. This battery is reduced in various properties including charge/discharge cycling performance and storage performance at the elevated temperature, and there are cases where the gas release valve, which releases the gas from the internal pressure, works.

For heightening the output-improving effect of the invention, it is necessary to employ a current collection structure reduced in the resistance of wiring parts and connection parts. When such internal resistance is high, there are cases where the effect of the nonaqueous electrolyte of the invention is not sufficiently produced due to the internal resistance.

When the electrode group has the multilayer structure described above, this structure preferably is one in which the metal core parts of the electrode layers are bundled and welded to the terminal. When each electrode has a large area, this battery has increased internal resistance. In this case, it is preferred to form two or more terminals in each electrode to reduce the resistance.

When the electrode group has the wound structure described above, two or more lead structures are formed for each of the positive electrode and the negative electrode and bundled and connected to the terminal, whereby the internal resistance can be reduced.

By optimizing the structure, the internal resistance can be minimized. When the battery is to be used at a high current, it is preferred to regulate the impedance thereof as measured by the 10-kHz alternating-current method (hereinafter referred to as direct-current resistance component) to less than 10 milliohms. The direct-current resistance component thereof is more preferably less than 5 milliohms, even more preferably less than 2 milliohms. Although regulating the direct-current resistance component to 0.1 milliohm or less improves high-output characteristics, this regulation results in an increase in the proportion of current collector structure materials used and there are cases where the battery capacity decreases.

The nonaqueous electrolyte of the invention is effective in reducing the reaction resistance relating to lithium release from and insertion into active electrode materials, and this effect is thought to be a factor contributing to the realization of satisfactory low-temperature discharge characteristics. However, it was found that in ordinary batteries having high direct-current resistance, the effect of reducing reaction resistance cannot be fully reflected in low-temperature discharge characteristics because of inhibition by direct-current resistance. This problem is mitigated by using a battery having a small direct-current resistance component, whereby the effect of the nonaqueous electrolyte of the invention can be sufficiently exhibited.

From the standpoint of enabling the nonaqueous electrolyte to produce its effect to fabricate a high-output battery, it is especially preferred that this requirement and the requirement described above that the electric capacity of the battery elements packed in one secondary-battery case (electric capacity as measured in discharge from a fully charged state to a discharged state) is 3 ampere-hours (Ah) or higher should be simultaneously satisfied as stated above.

Examples 1

The invention will be explained below in more detail by reference to Examples, Comparative Examples, and Reference Examples. However, the invention should not be construed as being limited to the following Examples unless the invention departs from the spirit thereof.

Production of Difluorophosphate

Example 1

Sufficiently dried lithium hexafluorophosphate (LiPF$_6$) was dissolved in a concentration of 1 mol/L in a mixed solvent which was composed of ethylene carbonate (EC), dimethyl carbonate (DMC), and diethyl carbonate (DEC) in a volume ratio of 3:3:4 and had been purified in a dry argon atmosphere. Lithium carbonate was mixed with this mixture solution in an amount of 0.1 mol per kg of the solution, and the resultant mixture was reacted at 50° C. for 72 hours. Thereafter, this liquid reaction mixture was filtered and the filtrate was examined by ion chromatography. As a result, the amount of PO$_2$F$_2$ anions detected was 0.051 mol/kg.

Example 2

The same procedure as in Example 1 was conducted, except that potassium carbonate was used in place of the lithium carbonate. The amount of PO$_2$F$_2$ anions detected was 0.052 mol/kg.

Example 3

The same procedure as in Example 1 was conducted, except that calcium carbonate was used in place of the lithium carbonate. The amount of PO$_2$F$_2$ anions detected was 0.047 mol/kg.

Comparative Example 1

The same procedure as in Example 1 was conducted, except that the lithium carbonate was not used. No $PO_2F_2$ anion was detected.

Comparative Example 2

Sufficiently dried lithium hexafluorophosphate ($LiPF_6$) was dissolved in a concentration of 1 mol/L in a mixed solvent which was composed of ethylene carbonate (EC), dimethyl carbonate (DMC), and diethyl carbonate (DEC) in a volume ratio of 3:3:4 and had been purified in a dry argon atmosphere. Lithium carbonate was further added to this mixture solution in such an amount as to result in $10^{-3}$ M. This operation was conducted in a 25° C. environment. At about 10 minutes after the addition, the liquid was filtered. The filtrate was examined by ion chromatography. However, no $PO_2F_2$ anion was detected.

By thus sufficiently reacting lithium hexafluorophosphate with a carbonate in a nonaqueous solvent, a difluorophosphate can be produced.

Fabrication of Nonaqueous-Electrolyte Secondary Battery

Example 4

A nonaqueous-electrolyte secondary battery was fabricated in the following manner and evaluated. The results obtained are shown in Table 1.

[Production of Positive Electrode]

Ninety percents by weight lithium nickelate ($LiNiO_2$) as a positive-electrode active material was mixed with 5% by weight acetylene black as a conductive material and 5% by weight poly(vinylidene fluoride) (PVdF) as a binder in N-methylpyrrolidone solvent to prepare a slurry. Thereafter, the slurry was applied to each side of a 20-μm aluminum foil and dried. The coated aluminum foil was rolled with a pressing machine so as to result in a thickness of 80 μm. A strip having a width of 52 mm and a length of 830 mm was cut out of the coated foil to obtain a positive electrode. This strip had an uncoated part extending in the lengthwise direction over a length of 50 mm on each of the front and back sides, with the length of the active-material layer being 780 mm.

[Production of Negative Electrode]

Hundred parts by weight of an aqueous dispersion of sodium carboxymethyl cellulose (concentration of sodium carboxymethyl cellulose, 1% by weight) and 2 parts by weight of an aqueous dispersion of a styrene/butadiene rubber (concentration of styrene/butadiene rubber, 50% by weight) were added to 98 parts by weight of artificial graphite powder KS-44 (trade name; manufactured by Timcal), in which the value of d for the lattice plane (002) and the crystallite size (Lc) each determined by X-ray diffractometry were 0.336 nm and 100 nm or larger (264 nm), respectively, the ash content was 0.04% by weight, the median diameter determined by the laser diffraction/scattering method was 17 μm, and the BET specific surface area was 8.9 m²/g, and which, in analysis by Raman spectroscopy with argon ion laser light, had an intensity ratio R ($R=I_B/I_A$), i.e., ratio between the peak $P_A$ in the range of 1,580-1,620 $cm^{-1}$ (peak intensity $I_A$) and the peak $P_B$ in the range of 1,350-1,370 $cm^{-1}$ (peak intensity $I_B$), of 0.15 and a half-value width of the peak in 1,580-1,620 $cm^{-1}$ range of 22.2 $cm^{-1}$. The resultant mixture was mixed by means of a disperser to obtain a slurry. This slurry was evenly applied to each side of a copper foil having a thickness of 18 μm as a negative-electrode current collector and dried. Thereafter, the coated foil was rolled with a pressing machine so as to result in a thickness of 85 μm. A strip having a width of 56 mm and a length of 850 mm was cut out of the coated foil to obtain a negative electrode. This strip had an uncoated part extending in the lengthwise direction over a length of 30 mm on each of the front and back sides.

[Preparation of Electrolytic Solution]

The reaction mixture filtrate obtained in Example 1 was used as a nonaqueous electrolyte. This reaction mixture filtrate had a fluoride salt concentration of 0.02 mol/kg, did not contain a detectable amount of lithium carbonate, and had a difluorophosphate concentration of 0.051 mol/kg.

[Battery Fabrication]

The positive and negative electrodes and a porous polyethylene sheet as a separator sandwiched between these were wound into a roll to obtain an electrode group, which was packed into a battery can. Thereafter, 5 mL of the electrolyte was introduced into the battery can having the electrode group packed therein, and was sufficiently infiltrated into the electrodes. This battery can was caulked to produce a 18650 type cylindrical battery.

[Battery Evaluation]

The fresh battery which had undergone no actual charge/discharge cycling was subjected to 5 cycles of initial charge/discharge at 25° C. The discharge capacity as measured at 0.2 C (the value of current at which the rated capacity based on 1-hour-rate discharge capacity is discharged over 1 hour is taken as 1 C; the same applies hereinafter) in the fifth cycle in this operation was taken as initial capacity.

Thereafter, the battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total.

The battery which had undergone the cycle test was subjected to 3 cycles of charge/discharge in a 25° C. environment. The 0.2-C discharge capacity thereof as measured in the third cycle was taken as capacity after durability test.

Comparative Example 3

A secondary battery was fabricated in the same manner as in Example 4, except that the solution obtained in Comparative Example 1 (concentration of lithium hexafluorophosphate, 1 mol/L) was used as a nonaqueous electrolyte in place of the reaction mixture filtrate obtained in Example 1. This battery was evaluated in the same manner as in Example 4, and the results obtained are shown in Table 1.

Reference Example 1

A secondary battery was fabricated in the same manner as in Example 4, except that the following solution was used as a nonaqueous electrolyte in place of the reaction mixture filtrate obtained in Example 1. Sufficiently dried lithium hexafluorophosphate ($LiPF_6$) was dissolved in a concentration of 1 mol/L in a mixed solvent which was composed of ethylene carbonate (EC), dimethyl carbonate (DMC), and diethyl carbonate (DEC) in a volume ratio of 3:3:4 and had been purified in a dry argon atmosphere. Furthermore, lithium difluorophosphate produced by the method described in non-patent document 1 was added thereto in a concentration of 0.05 mol/kg to produce the solution for use as a nonaqueous electrolyte. This battery was evaluated in the same manner as in Example 4, and the results obtained are shown in Table 1.

Comparative Example 4

A secondary battery was fabricated in the same manner as in Example 4, except that the solution obtained in Comparative Example 2 was used as a nonaqueous electrolyte in place of the reaction mixture filtrate obtained in Example 1. This battery was evaluated in the same manner as in Example 4, and the results obtained are shown in Table 1.

TABLE 1

|  | Initial capacity (mAh) | Capacity after durability test (mAh) |
|---|---|---|
| Example 4 | 700 | 622 |
| Comparative Example 3 | 700 | 596 |
| Reference Example 1 | 700 | 621 |
| Comparative Example 4 | 700 | 596 |

As apparent from Table 1, the nonaqueous electrolyte of the invention is effective in improving high-temperature cycle performance. This effect compares favorably with that in Reference Example 1, in which a difluorophosphate was used.

Incidentally, Comparative Example 4 corresponds to the Example 1 of JP-A-1-286263, and $LiPF_6$ and lithium carbonate were added in amounts of 1 mol/L and $10^{-3}$ M, respectively, as in that Example 1. However, a difluorophosphate was not yielded therein and the effect of the present invention was not obtained.

Example 5

A nonaqueous-electrolyte secondary battery was fabricated in the following manner and evaluated. The results obtained are shown in Table 2.
[Production of Positive Electrode]
Ninety percents by weight lithium nickelate ($LiNiO_2$) as a positive-electrode active material was mixed with 5% by weight acetylene black as a conductive material and 5% by weight poly(vinylidene fluoride) (PVdF) as a binder in N-methylpyrrolidone solvent to prepare a slurry. Thereafter, the slurry was applied to one side of a 20-μm aluminum foil and dried. The coated aluminum foil was rolled with a pressing machine so as to result in a thickness of 80 μm. A disk having a diameter of 12.5 mm was punched out of the coated foil with a punch to obtain a positive electrode.
[Production of Negative Electrode]
Hundred parts by weight of an aqueous dispersion of sodium carboxymethyl cellulose (concentration of sodium carboxymethyl cellulose, 1% by weight) and 2 parts by weight of an aqueous dispersion of a styrene/butadiene rubber (concentration of styrene/butadiene rubber, 50% by weight) were added to 98 parts by weight of artificial graphite powder KS-44 (trade name; manufactured by Timcal), in which the value of d for the lattice plane (002) and the crystallite size (Lc) each determined by X-ray diffractometry were 0.336 nm and 100 nm or larger (264 nm), respectively, the ash content was 0.04% by weight, the median diameter determined by the laser diffraction/scattering method was 17 μm, and the BET specific surface area was 8.9 m$^2$/g, and which, in analysis by Raman spectroscopy with argon ion laser light, had an intensity ratio R ($R=I_B/I_A$), i.e., ratio between the peak $P_A$ in the range of 1,580-1,620 cm$^{-1}$ (peak intensity $I_A$) and the peak $P_B$ in the range of 1,350-1,370 cm$^{-1}$ (peak intensity $I_B$), of 0.15 and a half-value width of the peak in 1,580-1,620 cm$^{-1}$ range of 22.2 cm$^{-1}$. The resultant mixture was mixed by means of a disperser to obtain a slurry. This slurry was evenly applied to one side of a copper foil having a thickness of 18 μm as a negative-electrode current collector and dried. Thereafter, the coated foil was rolled with a pressing machine so as to result in a thickness of 85 μm. A disk having a diameter of 12.5 mm was punched out of the coated foil with a punch to obtain a negative electrode.
[Preparation of Electrolytic Solution]
The reaction mixture filtrate obtained in Example 1 was used as a nonaqueous electrolyte. This reaction mixture filtrate was examined for carbon dioxide amount by the method described above. As a result, carbon dioxide was detected in an amount of 5,897 ppm.
[Battery Fabrication]
The positive and negative electrodes were superposed in a battery can through a porous polyethylene sheet having a diameter of 14 mm as a separator, and the electrolyte was dropped into the can. Thereafter, this can was caulked to produce a 2032 type coin battery.
[Battery Evaluation]
The fresh battery which had undergone no actual charge/discharge cycling was subjected to 3 cycles of initial charge/discharge at 25° C. The discharge capacity as measured at 0.2 C (the value of current at which the rated capacity based on 1-hour-rate discharge capacity is discharged over 1 hour is taken as 1 C; the same applies hereinafter) in the third cycle in this operation was converted to a value for the positive-electrode active material. This value was taken as initial capacity.

Thereafter, the battery was subjected to a storage test in a high-temperature environment of 60° C. The coin battery was charged beforehand in a 25° C. environment to a final charge voltage of 4.1 V by the constant-current constant-voltage method and then stored at 60° C. for 7 days.

The battery which had undergone the storage test was subjected to 3 cycles of charge/discharge in a 25° C. environment. The 0.2-C discharge capacity thereof as measured in the third cycle was converted to a value for the positive-electrode active material. This value was taken as capacity after storage. Furthermore, the proportion of the capacity after storage to the initial capacity was taken as recovery. The results obtained are shown in Table 2.

Example 6

A coin battery was fabricated in the same manner as in Example 5, except that the nonaqueous electrolyte was used after having been degassed for 1 minute in a 0.5-atm environment. This battery was evaluated in the same manner as in Example 5. The results obtained are shown in Table 2. This electrolyte was found to contain carbon dioxide in an amount of 1,165 ppm.

Reference Example 2

A coin battery was fabricated in the same manner as in Example 5, except that the same electrolyte as in Reference Example 1 was used as a nonaqueous electrolyte in place of the reaction mixture filtrate obtained in Example 1. This battery was evaluated in the same manner as in Example 5. The results obtained are shown in Table 2. This electrolyte was found to contain carbon dioxide in an amount of 125 ppm.

Comparative Example 5

A coin battery was fabricated in the same manner as in Example 5, except that a solution prepared by dissolving sufficiently dried lithium hexafluorophosphate (LiPF$_6$) in a concentration of 1 mol/L in a mixed solvent composed of ethylene carbonate (EC), dimethyl carbonate (DMC), and diethyl carbonate (DEC) in a volume ratio of 3:3:4 and purified in a dry argon atmosphere was used as a nonaqueous electrolyte in place of the reaction mixture filtrate obtained in Example 1. This battery was evaluated in the same manner as in Example 5. The results obtained are shown in Table 2. This electrolyte was found to contain carbon dioxide in an amount of 129 ppm.

TABLE 2

| | Carbon dioxide amount in electrolyte (ppm) | Initial capacity of positive-electrode active material (mAh/g) | Capacity after storage of positive-electrode active material (mAh/g) | Recovery (%) |
|---|---|---|---|---|
| Example 5 | 5897 | 156.5 | 148.9 | 95.14 |
| Example 6 | 1165 | 156.7 | 148.1 | 94.51 |
| Reference Example 2 | 125 | 156.6 | 147.7 | 94.32 |
| Comparative Example 5 | 129 | 156.6 | 146.5 | 93.55 |

The following were found from Table 2. Capacity after high-temperature storage and recovery become better as the carbon dioxide amount in the electrolyte increases. The nonaqueous electrolytes containing the difluorophosphate produced by the process of the invention are effective in improving the storage performance at the elevated temperature of a lithium secondary battery.

Example 7

A 2032 type coin cell was fabricated in the same manner as in Example 5 except the following.

As an electrolyte, use was made of one obtained by dissolving sufficiently dried lithium hexafluorophosphate (LiPF$_6$) in a concentration of 1 mol/L in a mixed solvent composed of ethylene carbonate (EC), dimethyl carbonate (DMC), and diethyl carbonate (DEC) in a volume ratio of 2:4:4 and purified in a dry argon atmosphere, mixing lithium carbonate with this mixture solution in an amount of 0.05 mol per kg of the solution, reacting the resultant mixture at 50° C. for 30 hours, and then filtering the mixture. This electrolyte was examined by ion chromatography. As a result, the amount of PO$_2$F$_2$ anions was found to be 0.025 mol/kg.

The low-temperature discharge capacity of this battery was determined by the following method, and the results obtained are shown in Table 3.

[Determination of Low-Temperature Discharge Capacity]

The fresh battery which had undergone no actual charge/discharge cycling was subjected to 3 cycles (3.0-4.1 V) of initial charge/discharge at 25° C. Thereafter, the battery was subjected to a discharge test in a low-temperature environment of −30° C. The coin battery was charged beforehand in a 25° C. environment to a final charge voltage of 4.1 V by the constant-current constant-voltage method and then discharged in the low-temperature environment at a rate of 0.2 C. The discharge capacity measurement in this discharge was converted to a value for the positive-electrode active material. This value was taken as low-temperature discharge capacity.

Example 8

A battery was fabricated in the same manner as in Example 7, except that a mixed solvent composed of ethylene carbonate (EC), dimethyl carbonate (DMC), and ethyl methyl carbonate (EMC) in a volume ratio of 2:4:4 was used as a nonaqueous solvent in preparing an electrolyte. This battery was examined for low-temperature discharge capacity in the same manner as in Example 7. The results obtained are shown in Table 3. This electrolyte was examined by ion chromatography. As a result, the amount of PO$_2$F$_2$ anions was found to be 0.025 mol/kg.

Comparative Example 6

A battery was fabricated in the same manner as in Example 7, except that an electrolyte was prepared without mixing lithium carbonate. This battery was examined for low-temperature discharge capacity in the same manner as in Example 7. The results obtained are shown in Table 3. In this electrolyte, no PO$_2$F$_2$ anion was detected.

Comparative Example 7

A battery was fabricated in the same manner as in Example 8, except that an electrolyte was prepared without mixing lithium carbonate. This battery was examined for low-temperature discharge capacity in the same manner as in Example 8. The results obtained are shown in Table 3. In this electrolyte, no PO$_2$F$_2$ anion was detected.

Reference Example 3

A battery was fabricated in the same manner as in Example 7, except that a mixed solvent composed of ethylene carbonate (EC) and diethyl carbonate (DEC) in a volume ratio of 2:8 was used as a nonaqueous solvent in preparing an electrolyte. This battery was examined for low-temperature discharge capacity in the same manner as in Example 7. The results obtained are shown in Table 3. This electrolyte was examined by ion chromatography. As a result, the amount of PO$_2$F$_2$ anions was found to be 0.025 mol/kg.

Comparative Example 8

A battery was fabricated in the same manner as in Reference Example 3, except that an electrolyte was prepared without mixing lithium carbonate. This battery was examined for low-temperature discharge capacity in the same manner as in Reference Example 3. The results obtained are shown in Table 3. In this electrolyte, no PO$_2$F$_2$ anion was detected.

The percentage improvements in low-temperature discharge capacity with a difluorophosphate which were calculated from a comparison between Example 7 and Comparative Example 6, comparison between Example 8 and Comparative Example 7, and comparison between Reference Example 3 and Comparative Example 8 are also shown in Table 3.

TABLE 3

| | Nonaqueous solvent | Low-temperature discharge capacity (mAh/g) | Percentage improvement with difluorophosphoric acid salt |
|---|---|---|---|
| Example 7 | EC:DMC:DEC | 80.1 | 52.6% based on Comparative Example 6 |
| Example 8 | EC:DMC:EMC | 79.5 | 48.9% based on Comparative Example 7 |
| Reference Example 3 | EC:DEC | 62.8 | 36.5% based on Comparative Example 8 |
| Comparative Example 6 | EC:DMC:DEC | 52.5 | |
| Comparative Example 7 | EC:DMC:EMC | 53.4 | |
| Comparative Example 8 | EC:DEC | 46 | |

It can be seen from Table 3 that the electrolytes containing a difluorophosphate bring about satisfactory low-temperature discharge characteristics. In this respect, it is apparent that the batteries of Example 7 and Example 8, in which the nonaqueous solvents each are a mixed solvent composed of three ingredients, are superior in both of the absolute value of low-temperature discharge capacity and the percentage improvement in low-temperature discharge capacity by the presence of a difluorophosphate to the battery of Reference Example 3, in which the nonaqueous solvent is a mixed solvent compound of two ingredients.

Production of Electrolytic Solution Containing Difluorophosphate

Example 9

Ethylene carbonate (EC), dimethyl carbonate (DMC), and ethyl methyl carbonate (EMC) which each had been dried were prepared in such amounts as to give a mixture of these in a volume ratio of 3:3:4. Lithium hexafluorophosphate (LiPF$_6$) was prepared in such an amount that this salt, when mixed with those solvents, gave a solution having a concentration of 1 mol/L. Furthermore, lithium carbonate was prepared in an amount of 0.05 mol per kg of the mixed solvent composed of those solvents.

First, the DMC was mixed with the EMC, and the LiPF$_6$ and the lithium carbonate were added thereto. This vessel was closed. The resultant mixture was reacted at 60° C. for 5 hours with stirring. Thereafter, the EC was mixed therewith.

The nonaqueous electrolyte thus obtained was examined by ion chromatography. As a result, the amount of PO$_2$F$_2$ anions detected was 0.024 mol/kg.

Example 10

The same procedure as in Example 9 was conducted, except that the timing of mixing the EC was changed so that it was mixed simultaneously with the DMC and EMC. The amount of PO$_2$F$_2$ anions detected was 0.004 mol/kg.

Example 11

The same procedure as in Example 10 was conducted, except that the reaction time was changed to 24 hours. The amount of PO$_2$F$_2$ anions detected was 0.015 mol/kg.

It can be seen from Examples 9, 10, and 11 that when LiPF$_6$ is reacted with lithium carbonate in a solvent not containing EC, which has a high relative permittivity, then the reaction proceeds rapidly. The conditions used in Example 11 are disadvantageous from the standpoint of productivity because the electrolyte obtained by conducting the reaction over as long as a whole day cannot be the same as that obtained in Example 9. Consequently, an industrially more advantageous method for producing a nonaqueous electrolyte containing EC is to react LiPF$_6$ with lithium carbonate in a solvent containing no EC and then add EC to the reaction mixture.

Example 12

A nonaqueous-electrolyte secondary battery was fabricated in the following manner and evaluated. The results obtained are shown in Table 4.
[Production of Positive Electrodes]

Ninety percents by weight lithium nickelate (LiNiO$_2$) as a positive-electrode active material was mixed with 5% by weight acetylene black as a conductive material and 5% by weight poly(vinylidene fluoride) (PVdF) as a binder in N-methylpyrrolidone solvent to prepare a slurry. The slurry obtained was applied to each side of a 15-μm aluminum foil and dried. The coated aluminum foil was rolled with a pressing machine so as to result in a thickness of 80 μm. Pieces which each had an active-material layer size having a width of 100 mm and a length of 100 mm and had an uncoated part having a width of 30 mm were cut out of the coated foil to obtain positive electrodes.
[Production of Negative Electrodes]

Hundred parts by weight of an aqueous dispersion of sodium carboxymethyl cellulose (concentration of sodium carboxymethyl cellulose, 1% by weight) and 2 parts by weight of an aqueous dispersion of a styrene/butadiene rubber (concentration of styrene/butadiene rubber, 50% by weight) were added respectively as a thickener and a binder to 98 parts by weight of artificial graphite powder KS-44 (trade name; manufactured by Timcal). The resultant mixture was mixed by means of a disperser to obtain a slurry. The slurry obtained was evenly applied to each side of a 10-μm copper foil and dried. The coated foil was rolled with a pressing machine so as to result in a thickness of 75 μm. Pieces which each had an active-material layer size having a width of 104 mm and a length of 104 mm and had an uncoated part having a width of 30 mm were cut out of the coated foil to obtain negative electrodes.
[Preparation of Electrolytic Solution]

The reaction mixture filtrate obtained in Example 1 was used as a nonaqueous electrolyte.
[Battery Fabrication]

Thirty-two positive electrodes and 33 negative electrodes were alternately disposed and superposed, with a porous polyethylene sheet separator (25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, collecting tabs were produced to obtain an electrode group. This electrode group was packed into a battery can (outer dimensions: 120×110×

10 mm). Thereafter, 20 mL of the electrolyte was introduced into the battery can packed with the electrode group and sufficiently infiltrated into the electrodes. This can was sealed to fabricate a battery.

[Battery Evaluation]

The fresh battery which had undergone no actual charge/discharge cycling was subjected to 5 cycles of initial charge/discharge at 25° C. The discharge capacity as measured at 0.2 C (the value of current at which the rated capacity based on 1-hour-rate discharge capacity is discharged over 1 hour is taken as 1 C; the same applies hereinafter) in the fifth cycle in this operation was taken as initial capacity.

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final voltage V) was taken as output (W), which is shown in Table 4.

Comparative Example 9

A battery was fabricated and tested in the same manner as in Example 12, except that the solution obtained in Comparative Example 1 (concentration of lithium hexafluorophosphate, 1 mol/L) was used as a nonaqueous electrolyte in place of the reaction mixture filtrate obtained in Example 1. The results obtained are shown in Table 4.

Example 13

The same test as in Example 12 was conducted, except that the battery to be evaluated was replaced by the same battery as that obtained in Example 4. The results obtained are shown in Table 4.

Comparative Example 10

The same test as in Example 12 was conducted, except that the battery to be evaluated was replaced by the same battery as that obtained in Comparative Example 3. The results obtained are shown in Table 4.

In Table 4 are also shown the percentage increase in output in Example 12 based on Comparative Example 9 and the percentage increase in output in Example 13 based on Comparative Example 10. Furthermore, the impedance of each battery as measured by the 10-kHz alternating-current method (direct-current resistance component) is also given.

It can be seen from Table 4 that the electrolyte containing a difluorophosphate brings about satisfactory output characteristics. In this respect, it is apparent that the battery of Example 12 is superior in percentage improvement in output characteristics to the battery of Example 13, which has a lower capacity and a higher direct-current resistance.

TABLE 4

| | Initial capacity (mAh) | Output (W) | Percentage improvement in output | Direct-current resistance |
|---|---|---|---|---|
| Example 12 | 6005 | 502 | 18.4% based on Comparative Example 9 | 5 mΩ |
| Comparative Example 9 | 6005 | 424 | | 5 mΩ |
| Example 13 | 700 | 45 | 12.5% based on Comparative Example 10 | 35 mΩ |
| Comparative Example 10 | 700 | 40 | | 35 mΩ |

INDUSTRIAL APPLICABILITY

According to the invention, a difluorophosphate which has been difficult to procure can be easily prepared from materials which are inexpensive and easily available. Thus, a difluorophosphate exceedingly useful as an additive for nonaqueous electrolytes for secondary batteries is provided. An aqueous electrolyte and a secondary battery each containing this difluorophosphate can be easily produced.

This application is based on a Japanese patent application filed on Jun. 20, 2005 (Application No. 2005-178828) and a Japanese patent application filed on Apr. 16, 2004 (Application No. 2004-121852), the contents thereof being herein incorporated by reference. The contents of the documents cited in this description are also incorporated by reference.

The invention claimed is:

1. A process for producing a difluorophosphate of a structure $PO_2F_2^-$, which comprises reacting a lithium hexafluorophosphate with a carbonate in a nonaqueous solvent, at a temperature of 30° C. to 70° C. at a molar ratio of said carbonate to said lithium hexafluorophosphate of $1\times10^{-3}$ to 1 or higher and a time of at least two hours and filtering a reaction product of said lithium hexafluorophosphate and said carbonate.

2. The process for producing a difluorophosphate as claimed in claim 1, wherein the carbonate is selected from the group consisting of alkali metal salts, alkaline earth metal salts, and salts represented by $NR^1R^2R^3R^4$, wherein $R^1$ to $R^4$ may be the same or different and each represents either an organic group having 1 to 12 carbon atoms or a hydrogen atom).

3. The process for producing a difluorophosphate as claimed in claim 1, wherein the nonaqueous solvent is one or more solvents selected from the group consisting of cyclic carbonates, linear carbonates, cyclic esters, linear esters, cyclic ethers, linear ethers, and sulfur-containing organic solvents.

4. The process for producing a difluorophosphate as claimed in claim 1, wherein the nonaqueous solvent is a nonaqueous solvent having a relative permittivity of lower than 10.

* * * * *